United States Patent [19]

Desbrandes

[11] Patent Number: 5,142,471
[45] Date of Patent: Aug. 25, 1992

[54] METHOD FOR DETERMINING THE PRESSURE OR STRESS OF A GEOLOGICAL FORMATION FROM ACOUSTIC MEASUREMENT

[75] Inventor: Robert Desbrandes, Baton Rouge, La.

[73] Assignee: Board of Supervisors of Louisiana State University and Agricultural and Mechanical College, Baton Rouge, La.

[21] Appl. No.: 504,923

[22] Filed: Apr. 5, 1990

[51] Int. Cl.$^5$ .............................................. E21B 49/00
[52] U.S. Cl. ...................................... 364/422; 73/155
[58] Field of Search ................ 364/422; 175/48, 50; 73/155, 151

[56] References Cited

U.S. PATENT DOCUMENTS

| | | | |
|---|---|---|---|
| 4,553,428 | 11/1985 | Upchurch | 175/48 |
| 4,557,295 | 11/1985 | Holmes | 175/48 |
| 4,797,821 | 6/1989 | Petak et al. | 73/155 |
| 4,845,982 | 7/1989 | Gilbert | 73/155 |
| 4,860,581 | 8/1989 | Zimmerman et al. | 73/155 |

OTHER PUBLICATIONS

Eberhart-Phillips et al., "Empirical Relationships Among Seismic Velocity, Effective Pressure, Porosity, and Clay Content in Sandstone," *Geophysics*, vol. 54, No. 1 (Jan., 1989), pp. 82-89.

Han et al., "Effects of Porosity and Clay Content on Wave Velocities in Sandstone," *Geophysics*, vol. 51, No. 11 (Nov., 1986), pp. 2093-2107.

Towle, "Stress Effects on Acoustic Velocities of Rocks," PhD Thesis, Colorado School of Mines (7978), pp. 92-95.

*Primary Examiner*—Gail O. Hayes
*Attorney, Agent, or Firm*—John H. Runnels

[57] ABSTRACT

A method to determine stress, pore pressure, or other properties of a geological formation by measuring acoustic characteristics of the formation. The acoustic characteristics, which may be one or more of the following group of characteristics-compressional acoustic velocity, shear acoustic velocity, compressional acoustic attenuation, and shear acoustic attenuation-depend on the net stress of the formation. The net stress in turn, depends on the pore pressure. Measurements of one or more acoustic characteristics at several depths allows determination of the net stress, which in turn allows determination of the pore pressure and other properties of the formation.

19 Claims, 5 Drawing Sheets

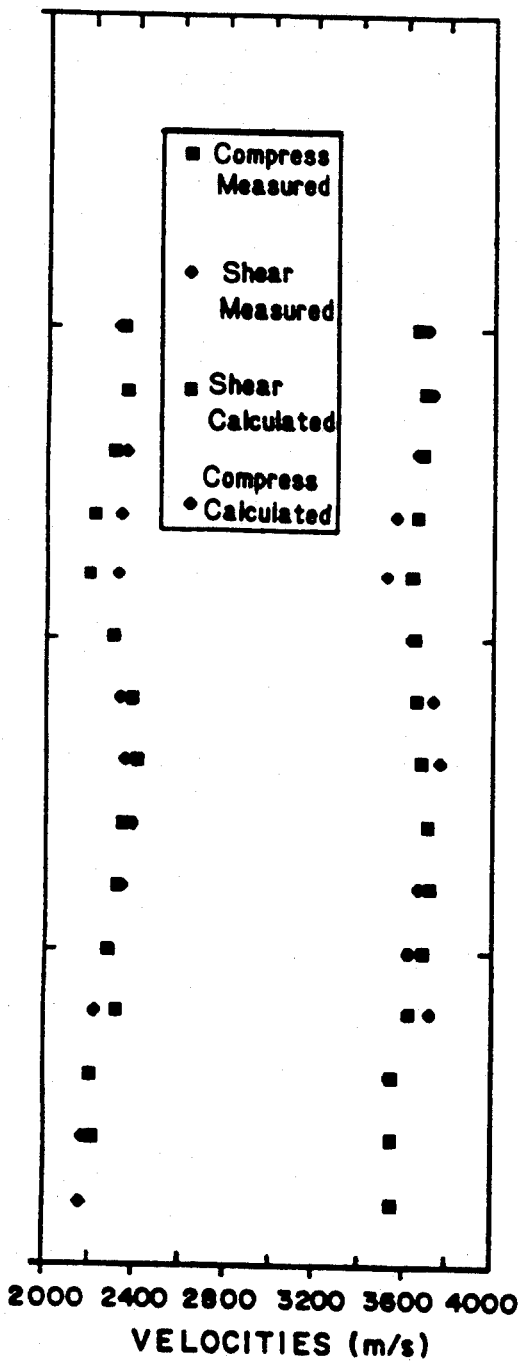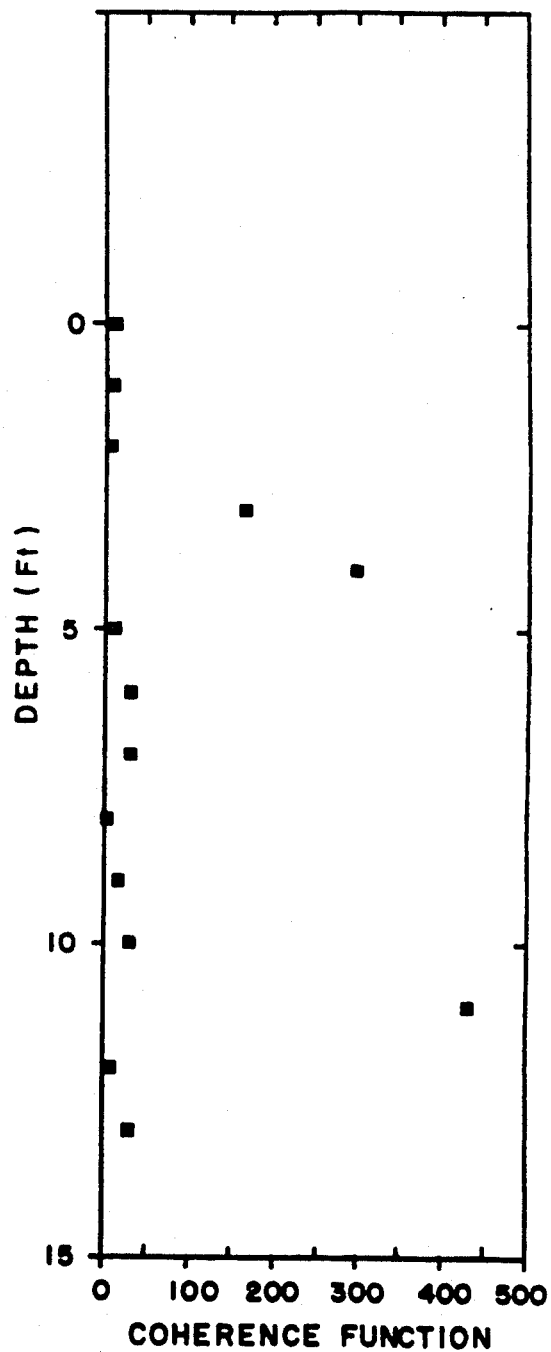
FIGURE 2A                                    FIGURE 2B

METHOD FOR DETERMINING THE PRESSURE OR STRESS OF A GEOLOGICAL FORMATION FROM ACOUSTIC MEASUREMENT

BACKGROUND OF THE INVENTION

This invention pertains to the measurement of pressure, stress, and other properties of a geological formation.

The pressure of a geological formation is an important measurement for several reasons. For example, the pressure of an oil-containing formation determines whether the oil will flow to the surface under its own pressure, or whether pumping is required. Similarly, the pressure of a water-containing formation determines whether an artesian well is possible, in which the water flows to the surface under its own pressure, or if pumping is needed. Generally, the pressure of a liquid determines whether the liquid will flow to the surface under its own pressure, or whether pumping is necessary. The pressure of a gas, on the other hand, is important in estimating the quantity of reserves of the gas. An estimate of the quantity of gas reserves permits an informed decision to be made as to whether it is desirable to produce gas from the formation.

There are two principal, commercially used, prior methods of measuring the pressure in an open hole formation. In a "drill stem test," a section of the bore hole is sealed off, and the ambient pressure in the sealed section is then measured. In a "wireline formation test," a seal is made on the side of the hole, and fluid from the sealed portion is allowed to bleed into a container, from which the pressure is measured.

Each of these two methods requires several hours, and is not always successful. There may be problems with getting a good mechanical seal because of enlargement of a formation into an open hole, the presence of a soft formation, or other difficulties. Even if a good seal is obtained, a formation with low permeability can result in a "dry test" with no meaningful measurement possible.

An alternative prior method is to measure the pressure in a cased hole. Making the seal is then easier, because the seal is made inside the casing. However, the appropriate casing must be perforated prior to the test. Therefore, this method is generally combined with a production test, and is usually not used unless there is an independent assessment that the chances for successful production are good.

There has existed an unfilled need for a convenient, inexpensive, easy-to-perform method to measure formation pressure in the field.

Prior work has reported the dependence of acoustic velocities in a geological formation on the net stress in the formation. See, e.g., Eberhart-Phillips et al., "Empirical Relationships Among Seismic Velocity, Effective Pressure, Porosity, and Clay Content in Sandstone," Geophysics, vol. 54, no. 1 (Jan. 1989), pp. 82-89; Han et al., "Effects of Porosity and Clay Content on Wave Velocities in Sandstones,"Geophysics, vol. 51, no. 11 (Nov. 1986), pp 2093-2107; Towle, "Stress Effects on Acoustic Velocities of Rocks,"PhD Thesis, Colorado School of Mines (11978), pp. 92-95. Eberhart-Phillips, supra at p. 82 suggested as a general goal that an empirical relationship expressing acoustic velocity as a function of porosity, shale content, and effective pressure might be used to estimate the effective pressure from measurement of in-situ velocity; and that pore pressure might thus be estimated from the estimate of effective pressure.

Despite the long-felt need for a convenient, inexpensive easy-to-perform method to measure formation stress or pressure, and despite the common availability of apparatus for measuring acoustic velocities in geological formations, to the knowledge of the inventor, no previous reference has disclosed any practical means for achieving this general goal. To the knowledge of the inventor, no previous reference has disclosed a practical, working means for estimating the net stress or pore pressure of a geological formation using only downhole geophysical log measurements, particularly using measurements of acoustic characteristics of the formation taken at several depths within the formation.

SUMMARY OF THE INVENTION

It is an object of this invention to provide a convenient, easy-to-perform, and relatively inexpensive method to measure the pressure in a geological formation.

It is an object of this invention to provide a convenient, easy-to-perform, and relatively inexpensive method to measure the net stress in a geological formation.

It is an object of this invention to provide a convenient, easy-to-perform, and relatively inexpensive method to measure the pressure gradient or pressure profile in a geological formation.

It is an object of this invention to provide a method capable of making the above measurements in an open hole, or in a cased hole with or without perforations.

It is an object of this invention to provide a method to make these measurements using geophysical log data, particularly data relating to acoustic characteristics of the formation, without requiring any seal to be made in a bore hole.

It is a feature of this invention to make measurements of one or more acoustic characteristics of the formation at several depths within the formation. These acoustic characteristics may be one or more of the following acoustic properties: compressional acoustic velocity, shear acoustic velocity, compressional acoustic attenuation, and shear acoustic attenuation. By combining these and other measurements, measurements of net stress, pressure, pressure gradients, and other geological properties may be derived.

It is an advantage of this invention that such measurements of acoustic characteristics allow the determination of net stress, pressure, pressure gradients, and other geological properties in a manner which is convenient, easy-to-perform, relatively inexpensive, and which may be performed in an open hole, or in a cased hole with or without perforations, and without requiring that any seal be made in the bore hole.

Taking measurements of acoustic characteristics at several depths in the formation allows optimization of the measurement of net stress. Once the net stress is determined, the pore pressure, pressure gradient, and other geophysical properties of the formation may be readily determined using other, known characteristics of the formation.

BRIEF DESCRIPTION OF THE DRAWINGS

FIG. 2A illustrates values for compressional and shear acoustic velocities which have previously been measured in that formation, and values for those acoustic characteristics which were calculated in accordance with the present invention, both as a function of depth.

FIG. 2B illustrates the error or coherence function at each depth illustrated in FIG. 2A, when the total error or coherence function at all depths is a minimum.

DETAILED DESCRIPTION OF THE INVENTION

Figure 1A:
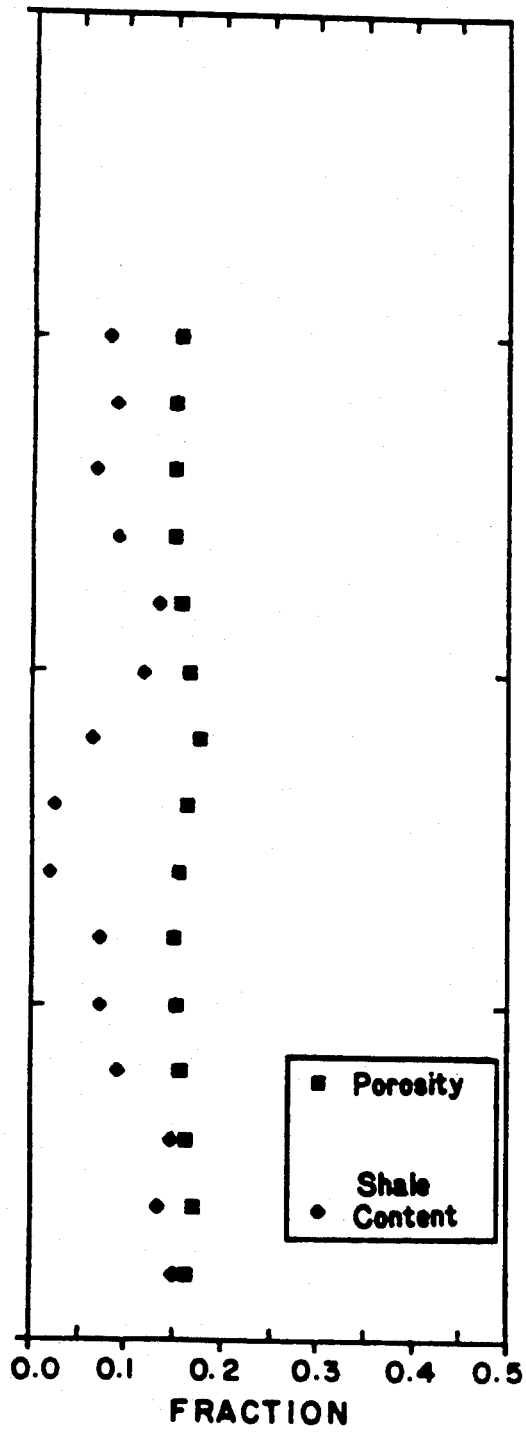
FIG. 1A illustrates the porosity and shale content of a particular geological formation as a function of depth.

Apparatus and methods for measuring acoustic velocities and acoustic attenuations in geological formations are known in the art of particular interest are the longitudinal, or compressional, acoustic velocity and acoustic attenuation, to be denoted $v_p$ and $a_p$, respectively, and the transverse, or shear, acoustic velocity and acoustic attenuation, to be denoted $v_s$ and $a_s$, respectively. Although the method of this invention may be practiced using only measurements of any one of these acoustic characteristics, it is expected that calculated pressures will usually be more accurate the more different types of these measurements that are used. Also, it is expected that using only acoustic velocities will usually be more accurate than using only acoustic attenuations, because with current technology the acoustic velocities may usually be measured more accurately than the acoustic attenuations.

Both the acoustic velocities and the acoustic attenuations are dependent on the nature of the particular geological formation, its porosity, the nature of any fluids present in the formation, the shale content, and the net stress of the formation. The net stress of the formation, in turn, depends among other things on the pressure within the formation. Thus, as described in greater detail below, measuring these acoustic characteristics allow one to determine the net stress of the formation; and a determination of the net stress allows one to determine the pressure of the formation.

It is expected that the method of this invention will work best in formations having a thickness not less than about four feet (about 1.3 meter), and preferably not less than about ten feet (about 3 meters). The formation lithology ideally should be approximately the same throughout the area measured, although methods for using this invention where this condition is not met are discussed below. For example, the lithology could be a sand-sandy shale stratum; a limestone-shaly limestone stratum; or any combination of sand, limestone, and dolomite, provided that the proportions of these basic constituents remain relatively constant (although shale content may vary). It is known in the art of geophysical log interpretation how to generate lithology profiles, which profiles would readily permit one skilled in the art to select an appropriate such formation Parameters which must be known, measured, or estimated are the overburden pressure of the overlying sediments, and the overburden pressure gradient. Both of these parameters may be measured or estimated through means known in the art.

The method of the present invention should work with any relationship or set of relationships which sufficiently represents or models the dependence of one or more acoustic characteristics on stress. The acoustic characteristic may depend on one or more other parameters as well, such as porosity and shale content.

One form for expressing the acoustic velocities and acoustic attenuations is as follows:

$$v_p = v_p' - b_p F - d_p C + f_p(n) \quad (1)$$
$$v_s = v_s' - b_s F - d_s C + f_s(n) \quad (2)$$
$$a_p = a_p' - q_p F - r_p C + g_p(n) \quad (3)$$
$$a_s = a_s' - q_s F - r_s C + g_s(n) \quad (4)$$

where $v_p'$ = unperturbed rock matrix compressional acoustic velocity $v_s'$ = unperturbed rock matrix shear acoustic velocity $a_p'$ = unperturbed rock matrix compressional acoustic attenuation $a_s'$ = unperturbed rock matrix shear acoustic attenuation $b_p, b_s, d_p,$
$d_s, q_p, q_s,$ } = linear coefficients
$r_p, r_s$ $F$ = formation porosity fraction ("porosity")
$C$ = formation shale content fraction ("shale content")
$n$ = net vertical stress $f_p, f_s,$
$g_p, g_s$ } = functions to be determined The values of the above parameters can yield useful information. The unperturbed values $v_p'$, $v_s'$, $a_p'$, and $a_s'$ are believed to be related to the degree of microfissuration in the formation, and are expected generally to decrease as the level of microfissuration increases. The parameters $b_p$, $b_s$, $q_p$, and $q_s$ are believed to be related to the average pore aspect ratio in the formation, and are generally expected to decrease as the pore aspect ratio decreases. The pore aspect ratio is the ratio of the smallest dimension of a pore to the largest dimension; the pore aspect ratio is 1.0 for a sphere, and a small fraction for a crack or fissure. The parameters $d_p$, $d_s$, $r_p$, $r_s$ are related to the type of shale present; it is expected that these parameters will be larger for softer shales, such as those including a large amount of smectite; and will be smaller for harder shales, such as those including a large amount of illite, and especially those containing a large amount of kaolinite.

Expressions (1) to (4) may be written more generally for an acoustic characteristic x:

$$= x_o - bF - dC + f(n)$$

where
- x is the acoustic characteristic;
- b is a linear coefficient;
- d is a linear coefficient;
- f(n) is a function of n; and
- $x_o$ is the value of acoustic characteristic x when F=0, C=0, and f(n)=0.

$$n = P_b - \beta P_p$$

where
- $P_b$ = overburden pressure of overlying sediments
- $P_p$ = pore pressure, or formation pressure
- $\beta$ = linear coefficient (the "Biot constant")

The Biot constant $\beta$ depends on the type of formation, and typically varies from about 0.75 to 0 85 for consolidated rock to about 1.0 for shales and unconsolidated formations.

The linear coefficients in one or more of the relationships are initially assigned average or expected values, and are later optimized as described below. Their final values yield information about the parameters on which they depend.

The general forms of the functions $f_p$, $f_s$, $g_p$, and $g_s$ may be suggested by test data; and particular parameters to specify the functions from those general forms may initially be assigned average or expected values, and later optimized as described below. These functions may be approximated, for example, by a polynomial such as $$Kn - Ln^2$$

or an exponential function such as $$Q[n - \exp(-n/N)],$$

where K and L, or Q and N are coefficients to be estimated initially, and later optimized from the geophysical log data The coefficient K is believed to be related to rock strength; and the coefficient L is believed to be related to rock ductility. Substituting equation (5), for example, into equation (1) gives $$v_p = v_p' - b_p F - d_p C + K_p n - L_p n^2$$

The same substitution (with different coefficients) may similarly be made in equations 2, 3, and 4, so that each of the acoustic characteristics is expressed as a second-order function of n.

Another, and preferred, form for the acoustic velocities is as follows:

$$v_p^2 = [v_p' - b_p F - d_p C]^2 + f_p(n) \quad (6)$$

$$v_s^2 = [v_s' - b_s F - d_s C]^2 + f_s(n) \quad (7)$$

$$a_p^2 = [a_p' - q_p F - r_p C]^2 + g_p(n) \quad (8)$$

$$a_s^2 = [a_s' - q_s F - r_s C]^2 + g_s(n) \quad (9)$$

Again, the general form of the functions $f_p$, $f_s$, $g_p$, and $g_s$ may be suggested by test data; and particular parameters to specify the functions from those general forms may initially be assigned average or expected values, and later optimized as described below. A possible form for these functions is $$R n^{\frac{1}{2}}$$

where R is a linear coefficient.

A preferred form for these functions is $$R \log(n)$$

where R is a linear coefficient.

This preferred form may be generally related to an acoustic characteristic x as follows:

$$x^2 = [x_o - bF - dC]^2 + R \log(n) \quad (10)$$

Another possible form from the dependence of an acoustic characteristic x on formation parameters is $$x = x' - bF - dC^{0.5} + Q[n - \exp(-n/N)]$$

Measurements of one or more acoustic characteristics are taken and recorded (preferably digitally) at several depths within the formation. It is expected that the best results will be obtained by taking measurements at relatively frequent intervals, such as about 0.5 feet or about 0.2 meter apart. Porosity and shale content are determined at the same depths through means known in the art. If more than one acoustic characteristic is measured, the different acoustic characteristics may be measured at different depths or the same depths, although it will usually be more convenient to take all measurements at a common set of depths.

When only shale is present, the porosity may be treated as essentially zero, because the intrinsic porosity of the shale can be accounted for in the term C.

The net vertical stress n may be written as:

$$n(Z) = P_b(T) + G_b Z - \beta[P_p(T) - G_f Z] \quad (11)$$

where
- $P_b(T)$ = overburden pressure at the top of the formation
- $G_b$ = overburden pressure gradient in the formation
- $P_p(T)$ = pore pressure at the top of the formation
- $G_f$ = movable fluid pressure gradient in the formation
- Z = depth increment from the top of the formation Each of the parameters $P_b(T)$, $G_b$, and Z will be known, or may be determined through means known in the art. The movable fluid pressure gradient, $G_f$, is initially estimated to be the expected gradient for the type of fluid identified, for example, through interpretation of log data by conventional means. This parameter may, however, be varied in the optimization process described below. Thus n effectively becomes a function of Z and $P_p(T)$ only Initially the pore pressure $P_p(T)$ is assigned an average or expected hydrostatic pressure for formations in the same area at the same depth. The movable fluid pressure gradient is likewise assigned an expected or average value for the type of fluid identified. This identification may be made from geophysical log data through means known in the art.

Using the chosen relationship or relationships and the initial estimated values for the various parameters, calculated values for one or more acoustic characteristics, $v_p$, $v_s$, $a_p$, and $a_s$, at each depth are obtained, labelled $v_{pc}$, $v_{sc}$, $a_{pc}$, and $a_{sc}$. These calculated values are compared to the measured values, labelled $v_{pm}$, $v_{sm}$, $a_{pm}$, and $a_{sm}$. A coherence function E is calculated to represent the total deviation of all the measured values of the acoustic characteristics from the calculated values of those acoustic characteristics. A preferred example of coherence function E is a weighted sum of the squares of all such differences:

$$E = \Sigma\, w_p (v_{pci} - v_{pmi})^2 + w_s (v_{sci} - v_{smi})^2 +$$
$$\Sigma\, x_p (a_{pci} - a_{pmi})^2 + x_s (a_{sci} - a_{smi})^2$$

where $w_p$, $w_s$, $x_p$, and $x_s$ are weighting coefficients chosen to give more weight to the more accurately measured quantities With current technology for making such measurements, the weights for the acoustic velocities should generally be greater than the weights given to the acoustic attenuations. Appropriate values could be those such as $w_p = w_s = 1$, and $x_p = x_s = 0.5$. If only acoustic velocities are used, and $w_p = w_s = 1$, then the coherence function E is a simple sum of square of all the differences:

$$E = \Sigma (v_{pci} - v_{pmi})^2 + (v_{sci} - v_{smi})^2$$

Other forms of the coherence function E msy be used The purpose of the coherence function E is to represent, in a useful way, the total deviation of all calculated values of the pertinent acoustic characteristic or characteristics from the corresponding measured values. Another possible form for the coherence function E would be, for example, a simple sum or weighted sum of the absolute value of all differences between the measured values and the corresponding calculated values.

A minimal value for E is found or approximated through means known in the art by varying the estimated values for the unknown parameters.

A preferred method of calculating the coherence function E is to make a first minimalization of E; followed by a second minimalization in which any larger anomalies are discarded—for example, any differences between measured values and corresponding calculated values which are more than one, two, or three standard deviations as determined by the first minimalization. Such anomalies will usually result from a local change in rock composition or structure—for example, a streak of limestone or dolomite in a sandstone stratum.

A matrix approach from multiple linear regression analysis msy be used to assist in optimizing the coherence function in the case where a linear equation is used to express acoustic characteristic x:

$$x = x_o - bF - dC + Rf(n)$$

where x is the acoustic characteristic;
b is a linear coefficient;
F is the porosity of the formation;
d is a linear coefficient;
C is the fractional shale content;
R is a linear coefficient;
n is the stress; and
f(n) is a specified function of n, such as log(n); and
$x_o$ is the value of the acoustic characteristic when $F = 0$, $C = 0$, and $f(n) = 0$.

When measurements are taken at j different depths, the porosity, shale content, and value of coefficient R may differ at each such depth. Thus the relationships may be written as j equations for calculated values $x_c$:

$$x_{c1} = x_o - bF_1 - dC_1 + Rf(n_1)$$
$$x_{c2} = x_o - bF_2 - dC_2 + Rf(n_2)$$
$$\vdots$$
$$x_{cj} = x_o - bF_j - dC_j + Rf(n_j)$$

This set of equations may be expressed in matrix form:

$$\begin{bmatrix} 1 & -F_1 & -C_1 & f(n_1) \\ 1 & -F_2 & -C_2 & f(n_2) \\ \vdots & & & \vdots \\ & & & \\ 1 & -F_j & -C_j & f(n_j) \end{bmatrix} \begin{bmatrix} x_o \\ b \\ d \\ R \end{bmatrix} = \begin{bmatrix} x_{c1} \\ x_{c2} \\ \vdots \\ \\ x_{cj} \end{bmatrix}$$

or in matrix notation $$A\,B = X.$$

where A is the above $j \times 4$ matrix; B is the above $4 \times 1$ matrix; and X is the above $j \times 1$ matrix.

The measured values of $x - x_m$ — may also be written as a $j \times 1$ matrix:

$$M = \begin{bmatrix} x_{m1} \\ x_{m2} \\ \vdots \\ \\ x_{mj} \end{bmatrix}$$

Then the best values for the coefficients $x_o$, b, d, and R (the components of matrix B) for a given set of stresses $n_1$, $n_2$, ..., $n_j$ may be found by first calculating the pertinent entries in matrix A for $f(n_1)$, $f(n_2)$, ..., $f(n_j)$, and then solving the matrix equation $$B = (A^T A)^{-1} A^T M$$

where
$A^T$ is the transpose of A; and $(A^T A)$

Once the elements of matrix B have thus been determined, the calculated values of the acoustic characteristic can be determined at each depth, and the coherence function may be calculated as above. These calculations may then be repeated after varying one or more of the estimated values of the stresses $n_1$, $n_2$, ..., $n_j$, until a minimum for the coherence function has been found or approximated.

Alternately, the correlation coefficient corresponding to matrix A may be calculated through known means. The best fir for the stresses is obtained when the correlation coefficient is a maximum.

For nonlinear equations, such as equation (10), a pseudo-linear expansion may be used in the matrix approach, such as $$\begin{bmatrix} 1 & F_1^2 & C_1^2 & F_1 & C_1 & F_1C_1 & \log(n_1) \\ \vdots & & & & & & \vdots \\ 1 & F_j^2 & C_j^2 & F_j & C_j & F_jC_j & \log(n_j) \end{bmatrix} \begin{bmatrix} x_o^2 \\ b^2 \\ d^2 \\ -2bx_o \\ -2dx_o \\ 2bd \\ R \end{bmatrix} = \begin{bmatrix} x_{c1}^2 \\ \vdots \\ x_{cj}^2 \end{bmatrix}$$

The values thus calculated from $x_o^2$, $b^2$, and $d^2$ may or may not be completely consistent with the values calculated for $-2bx_o$, $-2dx_o$, and $2bd$. The degree of this departure should be an indication of how well the form of the relationship fits the data.

More generally, by comparing the total error for different relationship forms, the form with the smallest total error msy be found, and should generally give the best estimate for the net stress or pore pressure.

The method of the present invention can be implemented in a formation containing a vertical sequence of non-homogeneous zones. Each zone within the sequence should be homogeneous, or nearly homogeneous (in the sense that each zone individually is a substantially homogeneous rock matrix, containing substantially the same fluid throughout the formation, but with possibly varying porosity and shale content.) A pressure for each zone is calculated by minimizing a coherence function $E_i$ for each zone i. Then an overall minimization for an overall coherence function E for the whole sequence is performed for all the parameters for all the zones. The different zones could comprise sand and shale; limestone and shale; dolomite and shale; some other mixture of the preceding groups of rock types; or a mixture including other rock types Within each zone, the parameters to determine the equations for one or more acoustic characteristics are independently found using the method of this invention. The pressures will then be constrained to vary continuously across the border between any two contiguous zones when it is expected that vertical communication of fluid between the zones is possible, i.e., that there is no intermediate impervious layer. Then an optimization of the overall coherence function is made using the relationships for all the zones; iteration of the process will generally be required to achieve convergence On the other hand, the pressure should not be constrained to vary continuously across an impervious layer When there are any impervious layers, only the zones between two impervious layers (with no other intervening impervious layers) should be the subject of an overall optimization, because the pressure need not vary continuously across an impervious layer.

The greater the number of measurements that are taken—both the number of depths and the number of different types of acoustic characteristics—the greater the accuracy of this method should generally be.

The method of the present invention may also be implemented in a formation containing a fluid change, such as gas/oil, gas/water, or oil/water. The formation will be divided into two zones separated by the fluid/fluid boundary. The location of this boundary may be initially estimated through the interpretation of geophysical log data by methods known in the art. A pressure profile for each zone is determined through the use of the appropriate pressure gradient for each fluid, and minimizing the coherence function for each zone Then an overall minimization of the coherence function is performed for the entire formation In performing this overall minimization, the position of the fluid/fluid boundary is a parameter allowed to vary from the value of the initial estimate. Thus an overall pressure profile is obtained which will indicate the wettability of the formation, the movable hydrocarbon level, as well as the formation pressure.

If the fluid is a gas, the density of the fluid is a parameter which may be varied as part of the overall optimization. If the fluid is a liquid, its density will generally not vary to a significant degree.

EXAMPLE

The following data was taken form the Enron South Hogsback No. 138A Test Well in a gas zone. The data shown in the following table was measured in the zone from 7110 to 7134 feet.

TABLE

| Depth | F | C | $v_{pm}$ | $v_{sm}$ | $v_{pc}$ | $v_{sc}$ | n |
|---|---|---|---|---|---|---|---|
| 7110 | 0.161 | 0.039 | 3555 | 2194 | 3760.7 | 2383.5 | 291.62 |
| 7112 | 0.177 | 0.039 | 3599 | 2281 | 3665.2 | 2319.5 | 291.75 |
| 7114 | 0.175 | 0.026 | 3740 | 2396 | 3685.3 | 2337.6 | 291.87 |
| 7116 | 0.167 | 0.013 | 3740 | 2396 | 3741.3 | 2379.8 | 292.00 |
| 7118 | 0.165 | 0.065 | 3692 | 2318 | 3720.5 | 2347.2 | 292.13 |
| 7120 | 0.184 | 0.052 | 3692 | 2356 | 3621.7 | 2285.9 | 292.25 |
| 7122 | 0.165 | 0.039 | 3740 | 2396 | 3737.0 | 2367.6 | 292.38 |
| 7124 | 0.163 | 0.065 | 3692 | 2318 | 3732.6 | 2355.3 | 292.50 |
| 7126 | 0.171 | 0.117 | 3599 | 2245 | 3652.3 | 2283.4 | 292.63 |
| 7128 | 0.175 | 0.117 | 3555 | 2245 | 3628.6 | 2267.7 | 292.76 |
| 7130 | 0.182 | 0.117 | 3555 | 2211 | 3593.3 | 2244.3 | 292.88 |
| 7132 | 0.184 | 0.117 | 3692 | 2281 | 3581.5 | 2236.6 | 293.01 |
| 7134 | 0.165 | 0.117 | 3946 | 2478 | 3688.1 | 2307.2 | 293.14 |

In the above table, the depth is given in feet; the porosity F is the arithmetic mean of the porosity fraction as determined through density log measurements, and the porosity fraction as determined by neutron log measurements; C is the measured fractional shale content determined by natural gamma ray measurements; $v_{pm}$ is the measured compressional acoustic velocity, in meters per second; $v_{sm}$ is the measured shear acoustic velocity, in meters per second; $v_{pc}$ is the calculated compressional acoustic velocity, in meters per second, at the minimum calculated coherence function; $v_{sc}$ is the calculated shear acoustic velocity, in meters per second, at the minimum calculated coherence function; and n is the calculated net veritical stress, in bars, at the minimum calculated coherence function.

Then using equation (10) above yields a calculated pore pressure at the top of this formation of 3390 psi if the following estimates for parameters are used: the overburden pressure gradient is 1 psi per foot of depth, so $P_b(T)=7110$ psi; similarly, $G_b=1$ psi/ft.; $\beta=0.85$; $G_f=0.1$ psi/ft. The type of fluid present, in this case a gas, was determined through geophysical log data through means known in the art. The gas pressure gradient, $G_f$, was estimated from average gas pressures at the same depth from other wells in the same region. The Biot constant, $\beta$, was estimated based on values of B for similar sandstones. The overburden gradient was estimated from bulk density measurements, and from information from other wells in the region. The nature of the rock was determined from geophysical log data through means known in the art.

To begin the regression analysis, initial values for the various parameters must be estimated The pore pressure was initially estimated to be 3500 psi, based on observed formation pressure gradients of 0.49 psi/foot for other wells in the vicinity.

Initial values for $v_p'$ and $v_s'$ were taken to be those of solid quartz, 5445 m/s and 3300 m/s, respectively, from Desbrandes, Encyclopedia of Well Logging (1985), p. 185, which is incorporated by reference. The significantly lower values then calculated for the unperturbed acoustic velocities indicate a fair degree of microfissuration in the formation.

The coefficients $b_p$ and $b_s$ have been reported to be 6930 to 6940 meters per second for $b_p$, and 4910 to 4940 meters per second for $b_s$. See Eberhart-Phillips et al., Empirical Relationships among Seismic Velocity, Effective Pressure, Porosity, and Clay Content in Sandstone, Geophysics vol. 54, No. 1 (Jan. 1988), pp 82–89, which is incorporated by reference. These values were used to suggest initial estimates for these parameters. Because the converged values for these parameters were only slightly smaller, it was inferred that the formation has a nearly normal pore aspect ratio.

Initial estimates for the coefficients $d_p$ and $d_s$ were also suggested by the above Eberhart-Phillips reference, which gives 1730 to 2180 meters per second for $d_p$, and 1570 to 1890 meters per second for $d_s$. The lower values found for this formation suggest a higher smectite content.

Equation 11 was used to estimate the net stress as a function of depth, both in the initial estimate, and in subsequent iterations.

Standard techniques of multiple linear regression were used in making the best fits shown in the above table. The form of equation (10) was used both for vp and vs, giving as optimized equations:

$$v_p^2 = [4300 - 6680F - 745C]^2 + [1260]^2 \log_{10}(n) \qquad (12)$$

$$v_s^2 = [2725 - 4710F - 970C]^2 + [890]^2 \log_{10}(n) \qquad (13)$$

where $v_p$ and $v_s$ are both expressed in units of meters per second; F and C are dimensionless fractions; and n is expressed in bars.

The porosity measurements for this formation are illustrated in FIG. 1A, as a function of depth from the top of the formation, and are the arithmetic mean of the porosities determined by density log measurements and by neutron log measurements, through means known in the art.

The shale content measurements for this formation were determined by means known in the art, using measurements of radioactivity in the formation, the self potential of the formation in the open hole, and data on resistivity, density, and porosity.

Figure 1B:
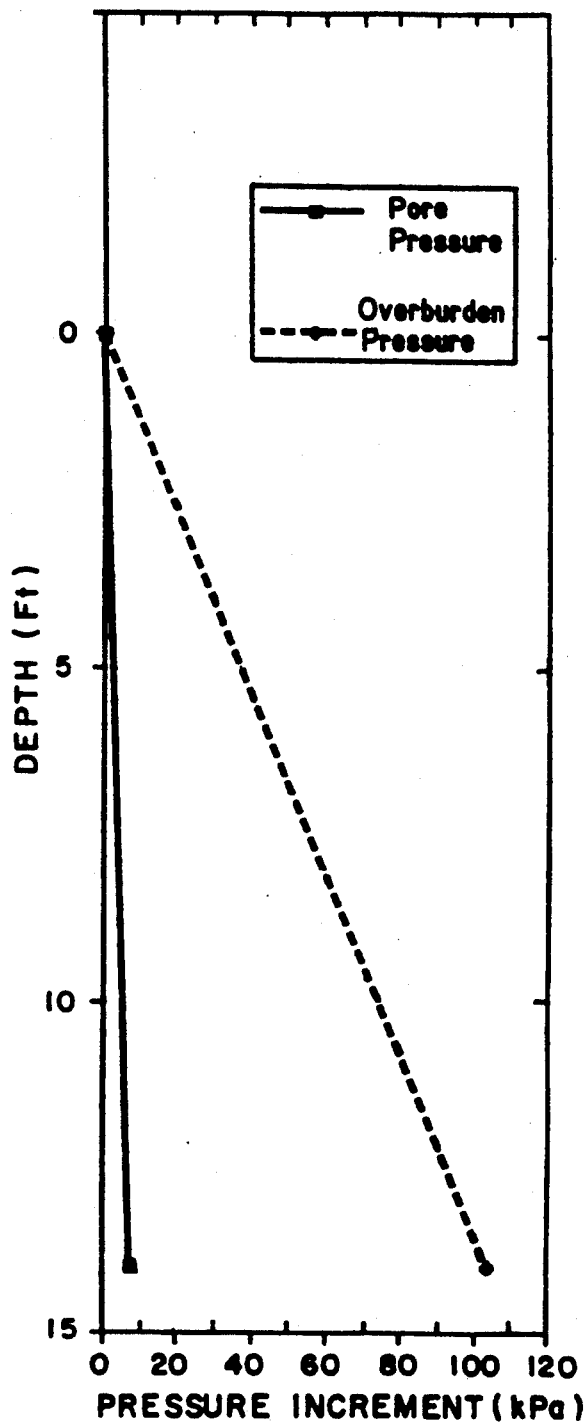
FIG. 1B illustrates the incremental overburden pressure and incremental pore fluid pressure of that geological formation as a function of depth.

The pore pressure gradient of 0.1 psi/foot illustrated in FIG. 1B was estimated based on data from similar formations, as was the estimated overburden pressure gradient of 1 psi/foot. The pore pressure gradient is a function of the density of movable fluid in the pore space. The connate water in the pore space is not expected to contribute to the pore pressure gradient in the region occupied by movable oil or gas. The pressure gradient of a liquid will not vary significantly, because liquids are nearly incompressible. The pore pressure gradient shown in FIG. 1B represents a gradient for gas, and will be a function of the gas pressure.

The measured and calculated compressional and shear acoustic velocities are illustrated in FIG. 2A as a function of depth from the top of the formation. FIG. 2B shows the relative value of the coherence function at each depth. The larger values of the coherence function at certain depths apparently result from thin streaks having petrographic characteristics different from those of the rest of the formation. More accurate calculations should generally result if these anomalous depths are disregarded, and a second optimization is then made.

Figure 3:
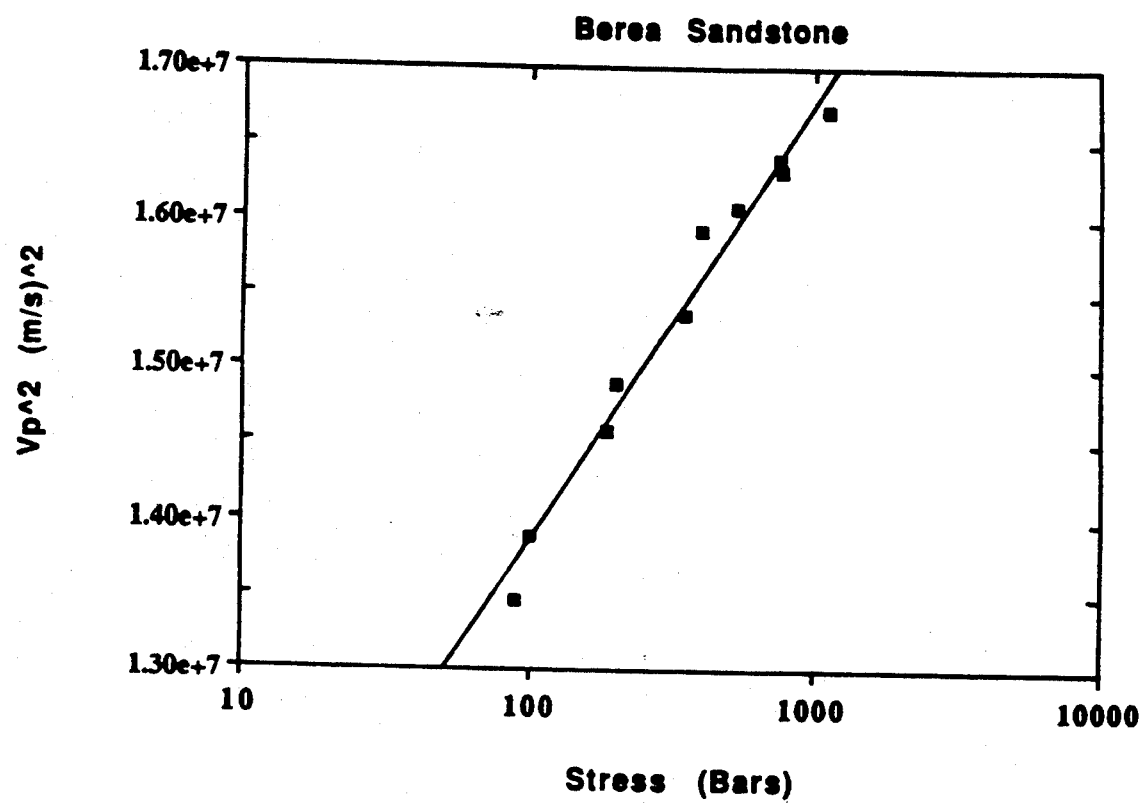
FIG. 3 illustrates a plot of the square of the compressional acoustic velocity versus the logarithm of the stress in a sample of Berea Sandstone.
Figure 4:
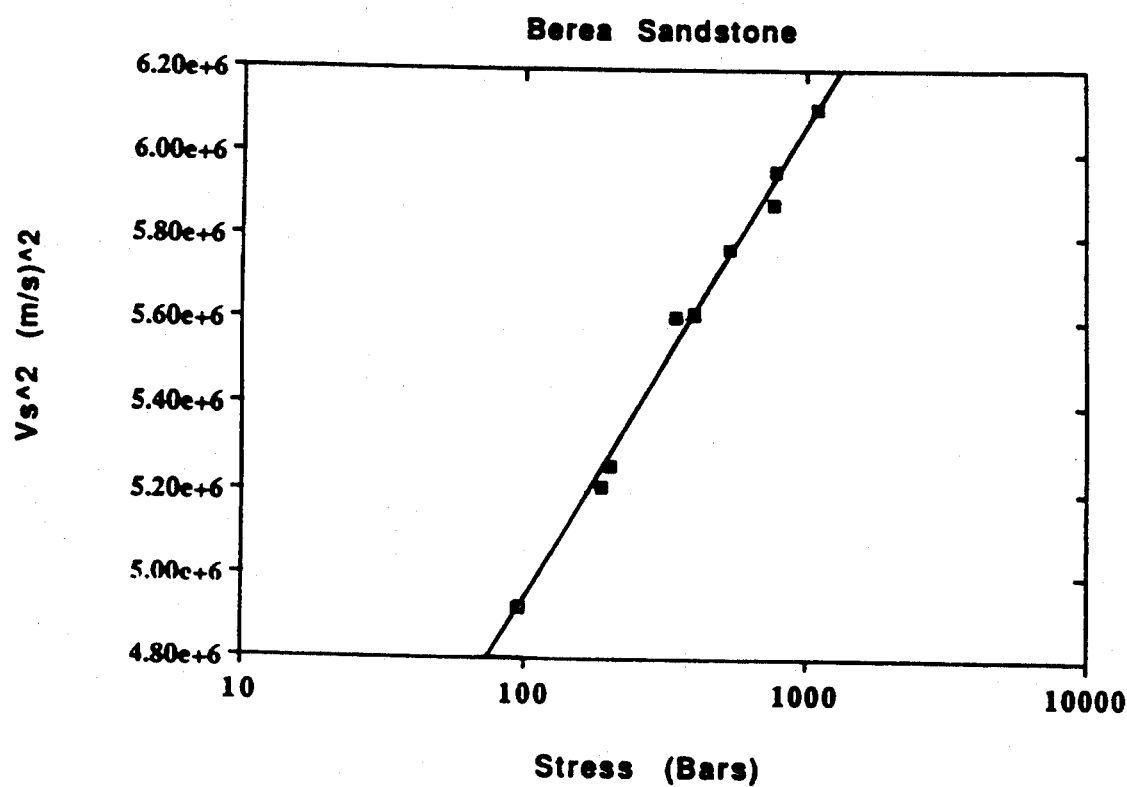
FIG. 4 illustrates a plot of the square of the shear acoustic velocity versus the logarithm of the stress in a sample of Berea Sandstone.

FIGS. 3 and 4 illustrate the basis for selecting equation (10) as a preferred form for expressing an acoustic characteristic x:

$$x^2 = [x_o - bF - dC]^2 + R \log(n) \qquad (10)$$

The inventor discovered this form by manipulating data published in Tosaya, Acoustical Properties of Clay-Bearing Rocks, PhD Thesis, Stanford University (1982), p 67, which is incorporated by reference. Replotting this data on a graph in which the vertical axis is the square of the acoustic velocity, and the horizontal axis is the logarithm of the stress, yields a set of points which fall close to straight line. See FIGS. 3 and 4, which are such replottings of Tosaya's data. The parameter R is believed to depend on the elasticity of the rock, and is expected to be greater the more elastic the rock is.

Berea Sandstone, depicted in the data of FIGS. 3 and 4, is representative of the consolidated sandstones typically encountered in oil and gas wells. The vertical axis in each of FIGS. 3 and 4 gives the square of the particular acoustic velocity, in units of $10^7 m^2 s^2$, and $10^6 m^2/s^2$, respectively. Although the shear acoustic velocity can be more difficult to measure than the compressional velocity, the better linear correlation of FIG. 4 compared to that of FIG. 3 suggests that it is preferred to use data including shear acoustic velocities when such data are available.

Figure 5:
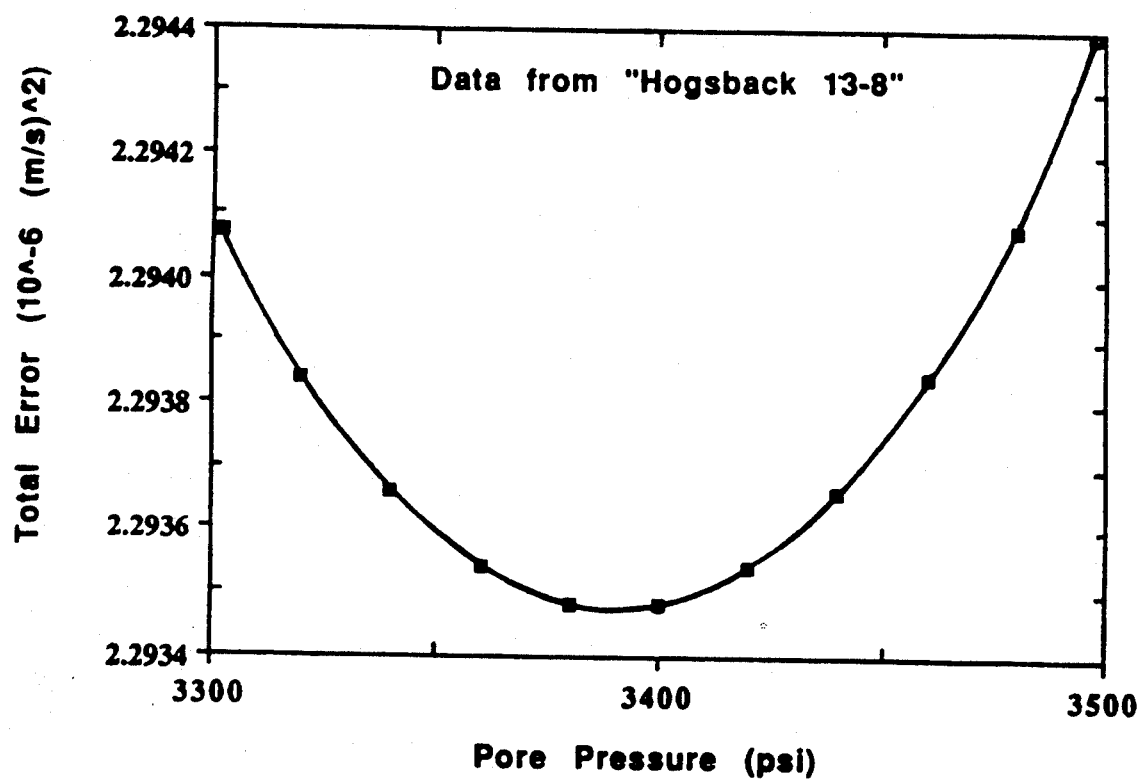
FIG. 5 illustrates the variation in the total error or coherence function versus calculated pore pressure in the geological formation of FIGS. 1 and 2.

FIG. 5 illustrates the variation of pore pressure with the total error or coherence function. The final pressure of 33q0 psi corresponds to the calculated minimum for the total error.

The coefficients $R_p$ and $R_s$, the coefficients for the logarithms of the compressional and shear velocities, respectively, in equations (12) and (13) were found to be $(1260)^2 (m/s)^2$ and $(890)^2 (m/s)^2$, respectively. The comparable figures for the Berea Sandstone of FIGS. 3 and 4 were found to be $(1688)^2 (m/s)^2$ and $(1009)^2 (m/s)^2$, respectively, suggesting that the formation sandstone has a lower elasticity than the Berea sandstone.

To the knowledge of the inventors, the pressure in this well has not been tested by conventional means as of the filing date of this application, but based on conventional pressure tests in neighboring wells, the pressure is expected to be in the vicinity of 3500 psi, in good agreement with the value of 3390 psi calculated through the method of the present invention.

Applications

Applications of the present invention, other than those discussed above, include the following In oil and gas wells, pressure could be monitored periodically or continuously during depletion. Changes in stress, pressure, and other properties could be monitored during heating cycles in thermal recovery. Mud characteristics in a column could be monitored.

In waste injection sites, changes in formation pressure and stress could be monitored.

Monitoring the stress along a geological fault could be used for many purposes, including prediction of seismic phenomena.

In a refinery or other industrial plant, the stress in a column of catalyst or other material could be monitored.

In food processing, an emulsion or slurry in a column could be monitored.

In any type of application, measurements may be made through movable sensors, as would be typical with a sonde used in geophysical log measurements; or measurements could be made from a plurality of stationary sensors, which could remain fixed in place for a period of time.

In many applications, absolute measurements may be less important than relative measurements taken st different times. Thus a degree of absolute error is tolerable, so long as the measurements are repeatable.

Definitions

An "acoustic characteristic" of a geological formation is one of the following properties of the formation: The compressional acoustic velocity, the shear acoustic velocity, the compressional acoustic attenuation, or the shear acoustic attenuation.

The "total error" of a set of calculated values of one or more acoustic characteristics is any useful representation or measure of the total deviation of all calculated values of the acoustic characteristic or characteristics from the corresponding measured value of the acoustic characteristic or characteristics. The "total error" could, for example, be a simple sum of the squares of the differences between measured and calculated values; a weighted sum of the squares of those differences; a simple sum of the absolute value of those differences; a weighted sum of the absolute value of those differences; or any other useful representation or measure of the total deviation of the calculated values from the measured values The "total error" may also be any such representation or measure which disregards individual differences greater than s determined amount.-for example, greater in absolute value than one, two, or three standard deviations.

A particular linear coefficient may, in some cases, be equal to zero.

In repeating certain steps as described in the claims below, it is of course not necessary to repeat any particular calculation whose result would be unchanged from the result of the previous execution of that calculation.

A reference in the claims to the "overburden pressure," to the "Biot constant," or to the "pressure, if any, due to movable fluid which is in the formation" refers to a value which alternatively may be measured through means known in the art, or may be estimated through means known in the art.

It is intended that the claims below be interpreted to read only on processes implemented in geophysical instruments, in fluid columns, in granular packings, in geological formations which have been altered by humans (for example, by depletion or injection), or in other physical apparatus, and not to read on any purely abstract mathematical formula or algorithm which is not embodied in some physical apparatus.

I claim:

1. A method for measuring and using the pressure in a geological formation, comprising the steps of:
   (a) placing a sonde in a bore hole in the formation at each of a plurality of depths, sending acoustic signals into the formation, receiving the acoustic signals as reflected from the formation with said sonde, and determining at least one acoustic characteristic of the formation at each of said depths from the reflected acoustic signals received by said sonde;
   (b) selecting estimated values for parameters determining a mathematical relationship, which relationship correlates values of the acoustic characteristic to values of stress;
   (c) selecting an estimated value for the stress at each of said depths; p1 (d) computing a calculated value for the acoustic characteristic at each of said depths through said mathematical relationship, said estimated parameters, and said estimated stress values;
   (e) computing the difference, at each of said depths, between said calculated value of the acoustic characteristic and said measured value of the acoustic characteristic;
   (f) computing a total error for all of said depths, from the values of each of said differences;
   (g) changing at least one of said estimated parameters, or changing at least one of said estimated stress values, and repeating steps (d), (e), (f), and (g) until the value of said total error reaches an approximate minimum, whereby the estimated value of the stress at each of said depths becomes the measured value of the stress at each of said depths;
   (h) selecting at least one of said depths;
   (i) at each of said selected depths, subtracting the measured stress at said selected depth from the overburden pressure at said selected depth;
   (j) at each of said selected depths, dividing the result of step (i) by the Biot constant of the formation at said selected depth;
   (k) at each of said selected depths, adding to the result of step (j) the pressure, if any, due to any movable fluid which is in the formation and which movable fluid lies above said selected depth, whereby the result of this step (k) becomes the measured pressure of the formation at said selected depth; and
   (l) performing at least one of the following steps (i), (ii), (iii), or (iv):
      (i) pumping liquid from the formation to the surface if the measured pressure indicates that the liquid will not flow to the surface under the liquid's own pressure;
      (ii) causing liquid from the formation to flow to the surface under the liquid's own pressure if the measured pressure indicates that the liquid will so flow;
      (iii) depleting liquid or gas from the formation, and monitoring the pressure of the formation during said depletion; or
      (iv) estimating the quantity of gas reserves in the formation from the measured pressure, and producing gas from the formation if the estimated reserves indicate that such production is desirable.

2. A method for measuring and using the pressure in a geological formation as recited in claim 1, additionally comprising the steps of:
   (a) identifying each of said depths for which said difference is less than a determined amount;
   (b) computing a calculated value for the acoustic characteristic at each of said identified depths through said mathematical relationship, said estimated parameters, and said estimated stress values;
   (c) computing the difference, at each of said identified depths, between said calculated value of the acoustic characteristic and said measured value of the acoustic characteristic;

(d) computing a total error for all of said identified depths, based on the values of each of said differences;

(e) changing at least one of said estimated parameters, or changing at least one of said estimated stress values, and repeating steps (b), (c), (d), and (e) until the value of said total error reaches an approximate minimum, whereby the estimated value of the stress at each of said identified depths becomes the measured value of the stress at each of said identified depths.

3. A method for measuring and using the pressure in a geological formation as recited in claim 1, wherein said geological formation comprises a plurality of layers, and wherein the steps of claim 6 are performed separately for each of said layers, and wherein the stress is constrained to vary continuously across the boundary between any two adjacent said layers whenever movable fluid may flow freely between said two adjacent layers.

4. A method for measuring and using the pressure in a geological formation as recited in claim 1, wherein said geological formation comprises a plurality of layers comprising differing fluids, and wherein the steps of claim 6 are performed separately for each of said layers; and wherein the stress is constrained to vary continuously across the boundary between any two adjacent said layers.

5. A method for measuring and using the pressure in a geological formation as recited in claim 4, wherein the position of the boundary between any two said adjacent layers is a parameter which may vary in any repetition of steps (d), (e), (f), and (g) of claim 6.

6. A method for measuring and using the pressure in a geological formation as recited in claim 1, wherein the mathematical relationship has the form $$x^2 = (x_o - bF - dC)^2 + f(n)$$

wherein
  x is the acoustic characteristic;
  b is a linear coefficient;
  F is the porosity of the formation;
  d is a linear coefficient;
  C is the fractional shale content of the formation;
  n is the stress;
  f(n) is a function of n; and
  $x_o$ is the value of the acoustic characteristic when $F=0$, $C=0$, and $f(n)=0$.

7. A method for measuring and using the pressure in a geological formation as recited in claim 6, wherein f(n) has the form $$f(n) = R \log(n)$$

where R is a linear coefficient.

8. A method for measuring and using the pressure in a geological formation as recited in claim 1, wherein the mathematical relationship has the form $$x = (x_o - bF - dC) + f(n)$$

wherein
  x is the acoustic characteristic;
  b is a linear coefficient;
  F is the porosity of the formation;
  d is a linear coefficient;
  C is the fractional shale content of the formation;
  n is the stress;
  f(n) is a function of n; and
  $x_o$ is the value of the acoustic characteristic when $F=0$, $C=0$, and $f(n)=0$.

9. A method for measuring and using the pressure in a geological formation as recited in claim 8, wherein f(n) has the form $$f(n) = R \log(n)$$

wherein R is a linear coefficient.

10. A method for measuring and using the pressure in a geological formation, comprising the steps of:

(a) placing a sonde in a bore hole in the formation at each of a plurality of depths, sending acoustic signals into the formation, receiving the acoustic signals as reflected from the formation with said sonde, and determining a first acoustic characteristic of the formation at each of said depths from the reflected acoustic signals received by said sonde;

(b) measuring a second acoustic characteristic of the formation at each of a plurality of second depths; wherein said first acoustic characteristic differs from said second acoustic characteristic; and wherein said second depths optionally may be, but are not necessarily, identical to said first depths;

(c) selecting estimated values for first parameters determining a first mathematical relationship, which first relationship correlates values of the first acoustic characteristic to values of stress;

(d) selecting estimated values for second parameters determining a second mathematical relationship, which second relationship correlates values of the second acoustic characteristic to values of stress;

(e) selecting an estimated value for the stress at each of said first depths, and an estimated value for the stress at each of said second depths;

(f) computing a calculated value for the first acoustic characteristic at each of said first depths through said first mathematical relationship, said estimated first parameters, and said estimated stress values;

(g) computing a calculated value for the second acoustic characteristic at each of said second depths through said second mathematical relationship, said estimated second parameters, and said estimated stress values;

(h) computing first differences, at each of said first depths, between said calculated value of the first acoustic characteristic and said measured value of the first acoustic characteristic;

(i) computing second differences, at each of said second depths, between said calculated value of the second acoustic characteristic and said measured value of the second acoustic characteristic;

(j) computing a total error, for all of said depths, from the values of each of said first differences and each of said second differences;

(k) changing at least one of said estimated parameters, or at least one of said estimated stress values, and repeating steps (f), (g), (h), (i), (j), and (k) until the value of said total error reaches an approximate minimum, whereby the estimated value of the stress at each of said depths becomes the measured value of the stress at each of said depths;

(l) selecting at least one of said depths;

(m) at each of said selected depths, subtracting the measured stress at said selected depth from the overburden pressure at said selected depth;

(n) at each of said selected depths, dividing the result of step (m) by the Biot constant of the formation at said selected depth;

(o) at each of said selected depths, adding to the result of step (n) the pressure, if any, due to any movable fluid which is in the formation and which movable fluid lies above said selected depth, whereby the result of this step (o) becomes the measured pressure of the formation at said selected depth; and (p) performing at least one of the following steps (i), (ii), (iii), or (iv):

(i) pumping liquid from the formation to the surface if the measured pressure indicates that the liquid will not flow to the surface under the liquid's own pressure;

(ii) causing liquid from the formation to flow to the surface under the liquid's own pressure if the measured pressure indicates that the liquid will so flow;

(iii) depleting liquid or gas from the formation, and monitoring the pressure of the formation during said depletion; or (iv) estimating the quantity of gas reserves in the formation from the measured pressure, and producing gas from the formation if the estimated reserves indicate that such production is desirable.

11. A method for measuring and using the pressure in a geological formation as recited in claim 10, additionally comprising the steps of:

(a) identifying each of said first depths for which said first difference is less than a determined amount, and identifying each of said second depths for which said second difference is less than a determined amount;

(b) computing a calculated value for the first acoustic characteristic at each of said first identified depths through said first mathematical relationship, said estimated first parameters, and said estimated stress values;

(c) computing a calculated value for the second acoustic characteristic at each of said second identified depths through said second mathematical relationship, said estimated second parameters, and said estimated stress values;

(d) computing first differences, at each of said first identified depths, between said calculated value of the first acoustic characteristic and said measured value of the first acoustic characteristic;

(e) computing second differences, at each of said second identified depths, between said calculated value of the second acoustic characteristic and said measured value of the second acoustic characteristic;

(f) computing a total error, for all of said identified depths, from the values of each of said first differences and each of said second differences;

(g) changing at least one of said estimated parameters, or at least one of said estimated stress values, and repeating steps (b), (c), (d), (e), (f), and (g) until the value of said total error reaches an approximate minimum, whereby the corresponding estimated value of the stress at each of said identified depths becomes the measured value of the stress at each of said identified depths.

12. A method for measuring and using the pressure in a geological formation as recited in claim 10, wherein said geological formation comprises a plurality of layers, and wherein the steps of claim 23 are performed separately for each of said layers, and wherein the stress is constrained to vary continuously across the boundary between any two adjacent said layers whenever movable fluid may flow freely between said two adjacent layers.

13. A method for measuring and using the pressure in a geological formation as recited in claim 10, wherein said geological formation comprises a plurality of layers, the layers comprising differing fluids, and wherein the steps of claim 23 are performed separately for each of said layers; and wherein the stress is constrained to vary continuously across the boundary between any two adjacent said layers whenever movable fluid may flow freely between said two adjacent layers.

14. A method for measuring and using the pressure in a geological formation as recited in claim 13, wherein the position of the boundary between any two adjacent said layers is a parameter which may vary in any repetition of steps (f), (g), (h), (i), (j), and (k) of claim 23.

15. A method for measuring and using the pressure in a geological formation as recited in claim 10, wherein said first acoustic characteristic comprises compressional acoustic velocity and said second acoustic characteristic comprises shear acoustic velocity.

16. A method for measuring and using the pressure in a geological formation as recited in claim 10, wherein at least one of said mathematical relationships has the form $$x^2 = (x_o - bF - dC)^2 + f(n)$$

wherein
x is the acoustic characteristic;
b is a linear coefficient;
F is the porosity of the formation;
d is a linear coefficient;
C is the fractional shale content of the formation;
n is the stress;
f(n) is a function of n; and
$x_o$ is the value of the acoustic characteristic when F=0, C=0, and f(n)=0.

17. A method for measuring and using the pressure in a geological formation as recited in claim 16, wherein f(n) has the form $$f(n) = R \, \log(n)$$

wherein R is a linear coefficient.

18. A method for measuring and using the pressure in a geological formation as recited in claim 10, wherein at least one of said mathematical relationships has the form $$x = (x_o - bF - dC) + f(n)$$

wherein
x is the acoustic characteristic;
b is a linear coefficient;
F is the porosity of the formation;
d is a linear coefficient;
C is the fractional shale content of the formation;
n is the stress;
f(n) is a function of n; and
$x_o$ is the value of the acoustic characteristic when F=0, C=0, and f(n)=0.

19. A method for measuring and using the pressure in a geological formation as recited in claim 18, wherein f(n) has the form f(n)=R log(n), wherein R is a linear coefficient.

* * * * *